(12) United States Patent
Chen (10) Patent No.: US 10,922,435 B2
(45) Date of Patent: Feb. 16, 2021

(54) IMAGE ENCRYPTION METHOD, IMAGE VIEWING METHOD, SYSTEM, AND TERMINAL

(71) Applicant: ZTE CORPORATION, Shenzhen (CN)

(72) Inventor: Lu Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 180 days.

(21) Appl. No.: 15/542,441

(22) PCT Filed: Sep. 10, 2015

(86) PCT No.: PCT/CN2015/089373
§ 371 (c)(1),
(2) Date: Jul. 10, 2017

(87) PCT Pub. No.: WO2016/115912
PCT Pub. Date: Jul. 28, 2016

(65) Prior Publication Data
US 2018/0278797 A1    Sep. 27, 2018

(30) Foreign Application Priority Data

Jan. 20, 2015  (CN) .......................... 201510028949.7

(51) Int. Cl.
*G06F 21/62* (2013.01)
*G06F 21/46* (2013.01)
*H04N 1/32* (2006.01)

(52) U.S. Cl.
CPC .......... *G06F 21/6254* (2013.01); *G06F 21/46* (2013.01); *G06F 21/62* (2013.01); *H04N 1/32272* (2013.01); *G06F 21/6245* (2013.01)

(58) Field of Classification Search
CPC .. H04N 1/32; H04N 1/32272; H04N 1/32267; G06F 21/10; G06F 21/60–629;
(Continued)

(56) References Cited

U.S. PATENT DOCUMENTS

| 6,839,844 B1 | 1/2005 | Okano et al. |
| 2003/0174893 A1 | 9/2003 | Sun et al. |

(Continued)

FOREIGN PATENT DOCUMENTS

| CN | 1922544 A | 2/2007 |
| CN | 101459807 A | 6/2009 |

(Continued)

OTHER PUBLICATIONS

China Patent Office, First Office Action dated Nov. 1, 2019 for corresponding Chinese application 201510028949.7.

(Continued)

*Primary Examiner* — Kristine L Kincaid
*Assistant Examiner* — Shaqueal D Wade
(74) *Attorney, Agent, or Firm* — Li & Cai Intellectual Property (USA) Office (57) ABSTRACT

An image encryption method, an image viewing method, a system, and a terminal are provided. The image encryption method includes: editing an original image, saving the edited original image as a first image file; encrypting the original image to generate an encrypted data block; and, splicing the first image file with the encrypted data block to generate and save a partially-encrypted image file. The image viewing method includes: when determining that indication information used for indicating partial encryption process is carried in an image file, decrypting an encrypted data block, and displaying data of an original image obtained after decrypting successfully; herein, the partially-encrypted image file is formed by splicing the first image file and the (Continued)

Analyze an image file, when determining that the image file carries indication information which is used for indicating partial encryption processing, determine a position of an encrypted data block contained in the image file according to the indication information; herein, the image file carrying the indication information is formed by splicing a first image file with the encrypted data block, the first image file contains image data obtained after editing the original image, the encrypted data block is a data block obtained after encrypting the original image — S10

Read and decrypt the encrypted data block, after decrypting successfully, obtain data of the original image, display the original image — S20 encrypted data block, the first image file contains edited original image data, and the encrypted data block corresponds to encrypted original image data.

8 Claims, 3 Drawing Sheets

(58) Field of Classification Search
CPC ...... G06F 21/46; G06F 21/62; G06F 21/6254; H04L 9/06; H04L 9/0618–0637; H04L 9/065; H04L 9/28; H04L 9/30
See application file for complete search history.

(56) References Cited

U.S. PATENT DOCUMENTS

| | | | |
|---|---|---|---|
| 2005/0185047 | A1 | 8/2005 | Hii |
| 2009/0262931 | A1* | 10/2009 | Nakagata ................. G09C 5/00 380/54 |
| 2010/0111293 | A1* | 5/2010 | Frenkel ................... G09C 5/00 380/28 |
| 2011/0019816 | A1* | 1/2011 | Inami ................... G06F 21/608 380/28 |
| 2013/0031636 | A1* | 1/2013 | Altschul ............... G06F 16/958 726/26 |
| 2014/0059344 | A1* | 2/2014 | Branton .................. G06F 21/10 713/165 |
| 2016/0004718 | A1* | 1/2016 | Lin ....................... G06F 16/128 707/690 |
| 2016/0255358 | A1* | 9/2016 | Agush ..................... G06F 16/51 382/233 |

FOREIGN PATENT DOCUMENTS

| | | |
|---|---|---|
| CN | 102567941 A | 7/2012 |
| CN | 103294961 A | 9/2013 |
| CN | 103400064 A | 11/2013 |
| CN | 103942469 A | 7/2014 |
| CN | 104615917 A | 5/2015 |
| CN | 104680077 A | 6/2015 |
| CN | 104680078 A | 6/2015 |

OTHER PUBLICATIONS

China Patent Office, Second Office Action dated Aug. 4, 2020 for corresponding Chinese application 201510028949.7.

* cited by examiner

IMAGE ENCRYPTION METHOD, IMAGE VIEWING METHOD, SYSTEM, AND TERMINAL

TECHNICAL FIELD

Embodiments of the present disclosure relate to, but are not limited to, the field of image processing and transmission technology, and more particularly to an image encryption method, an image viewing method, systems and terminals.

BACKGROUND

At present, when people disclose an image on the blog, or send a mass image in the chat group, sometimes for privacy protection, they hope that only those who have permission can see the complete image, and those who have no permission can only see part of the image.

In order to meet the needs of users, a method for image processing is needed.

SUMMARY

The following is an overview of the topics that are described in detail in the text. This summary is not intended to limit the protective scope of the claims.

The present disclosure provides an image encryption method, an image viewing method, systems and terminals. A terminal can encrypt the image by the image encryption method of the embodiment of the present disclosure, and when viewing the encrypted image with the image viewing method of the embodiment of the present disclosure, if decrypting successfully, the complete content of the original image is displayed.

An embodiment of the present disclosure provides an image encryption method, including:

editing an original image, saving the edited original image as a first image file;

encrypting the original image, generating an encrypted data block; and splicing the first image file with the encrypted data block to generate and save a partially-encrypted image file.

In an exemplary embodiment, splicing the first image file with the encrypted data block to generate and save a partially-encrypted image file includes:

generating and saving the partially-encrypted image file containing the first image file and the encrypted data block, herein in the partially-encrypted image file, file header information of the first image file carries first indication information, and the encrypted data block is spliced behind a file terminator of the first image file.

Herein, the first indication information is used to indicate partial encryption processing and contains length information of the encrypted data block and an indicator for indicating partial encryption processing.

In an exemplary embodiment, splicing the first image file with the encrypted data block to generate and save a partially-encrypted image file includes:

generating and saving the partially-encrypted image file containing the first image file, the encrypted data block, and second indication information, herein in the partially-encrypted image file, the encrypted data block is spliced behind the file terminator of the first image file, the second indication information is added behind the encrypted data block.

Herein, the second indication information is used to indicate partial encryption processing and contains length information of the encrypted data block and an indicator for indicating partial encryption processing.

In an exemplary embodiment, splicing the first image file with the encrypted data block to generate and save a partially-encrypted image file includes:

generating and saving the partially-encrypted image file containing the first image file, the encrypted data block, and third indication information, herein in the partially-encrypted image file, the encrypted data block is spliced behind the file terminator of the first image file, the third indication information is added between the file terminator of the first image file and the encrypted data block.

Herein, the third indication information is used to indicate partial encryption processing and contains length information of the encrypted data block and an indicator for indicating partial encryption processing.

In an exemplary embodiment, encrypting the original image includes:

when a user has set an encryption password, encrypting the original image with the encryption password, when the user has not set an encryption password, prompting the user to set the encryption password, and after the encryption password set by the user is obtained, encrypting the original image with the encryption password.

An embodiment of the present disclosure provides an image viewing method, including:

analyzing an image file, when determining that the image file carries indication information which is used for indicating partial encryption processing, determining a position of an encrypted data block contained in the image file according to the indication information;

reading and decrypting the encrypted data block, after decrypting successfully, obtaining data of an original image, displaying the original image.

Herein, the image file carrying the indication information is formed by splicing a first image file with the encrypted data block, the first image file contains image data obtained after editing the original image, the encrypted data block is a data block obtained after encrypting the original image.

In an exemplary embodiment, analyzing an image file, when determining that the image file carries indication information which is used for indicating partial encryption processing, determining a position of an encrypted data block contained in the image file according to the indication information includes:

analyzing a first image file out from a forepart of the image file, after determining that file header information of the first image file carries first indication information which is used for indicating partial encryption processing, determining that the encrypted data block is behind a file terminator of the first image file, determining an end position of the encrypted data block according to length information of the encrypted data block contained in the first indication information.

In an exemplary embodiment, analyzing an image file, when determining that the image file carries indication information which is used for indicating partial encryption processing, determining a position of an encrypted data block contained in the image file according to the indication information includes:

attempting to extract second indication information which is used for indicating partial encryption processing from a tail of the image file, if the second indication information is extracted, determining that the encrypted data block is before the second indication information, determining an initial position of the encrypted data block according to length information of the encrypted data block contained in the second indication information.

In an exemplary embodiment, analyzing an image file, when determining that the image file carries indication information which is used for indicating partial encryption processing, determining a position of an encrypted data block contained in the image file according to the indication information includes:

analyzing a first image file out from the forepart of the image file, attempting to extract third indication information which is used for indicating partial encryption processing from behind the file terminator of the first image file, if the third indication information is extracted, determining that the encrypted data block is behind the third indication information, determining the end position of the encrypted data block according to length information of the encrypted data block contained in the third indication information.

In an exemplary embodiment, reading and decrypting the encrypted data block, after decrypting successfully, obtaining data of an original image, displaying the original image includes:

reading the encrypted data block, prompting a user to input a decryption password, after receiving the decryption password input by the user, decrypting the encrypted data block according to the decryption password, if decrypting successfully, obtaining original image data before the encryption, displaying the original image.

An embodiment of the present disclosure further provides an image encryption system, including:

an editing module, configured to edit an original image, save the edited original image as a first image file;

an encrypting module, configured to encrypt the original image, generate an encrypted data block; and a splicing and saving module, configured to splice the first image file with the encrypted data block to generate and save a partially-encrypted image file.

In an exemplary embodiment, the splicing and saving module splices the first image file with the encrypted data block to generate and save a partially-encrypted image file, including:

the splicing and saving module generates and saves the partially-encrypted image file containing the first image file and the encrypted data block, and in the partially-encrypted image file, file header information of the first image file carries first indication information, and the encrypted data block is spliced behind a file terminator of the first image file.

Herein, the first indication information is used to indicate partial encryption processing and contains length information of the encrypted data block and an indicator for indicating partial encryption processing.

In an exemplary embodiment, the splicing and saving module splices the first image file with the encrypted data block to generate and save a partially-encrypted image file, including:

the splicing and saving module generates and saves the partially-encrypted image file containing the first image file, the encrypted data block, and second indication information, in the partially-encrypted image file, the encrypted data block is spliced behind the file terminator of the first image file, the second indication information is added behind the encrypted data block.

Herein, the second indication information is used to indicate partial encryption processing and contains length information of the encrypted data block and an indicator for indicating partial encryption processing.

In an exemplary embodiment, the splicing and saving module splices the first image file with the encrypted data block to generate and save a partially-encrypted image file, including:

the splicing and saving module generates and saves the partially-encrypted image file containing the first image file, the encrypted data block, and third indication information, in the partially-encrypted image file, the encrypted data block is spliced behind the file terminator of the first image file, the third indication information is added between the file terminator of the first image file and the encrypted data block.

Herein, the third indication information is used to indicate partial encryption processing and contains length information of the encrypted data block and an indicator for indicating partial encryption processing.

In an exemplary embodiment, the encrypting module encrypts the original image, including:

when a user has set an encryption password, the encrypting module encrypts the original image with the encryption password, when the user has not set an encryption password, the encrypting module prompts the user to set the encryption password, and after the encryption password set by the user is obtained, encrypts the original image with the encryption password.

An embodiment of the present disclosure provides an image viewing system, including:

a file analyzing module, configured to analyze an image file, when determining that the image file carries indication information which is used for indicating partial encryption processing, determine a position of an encrypted data block contained in the image file according to the indication information;

a decryption processing module, configured to read and decrypt the encrypted data block, after decrypting successfully, obtain data of an original image, display the original image.

Herein, the image file carrying the indication information is formed by splicing a first image file with the encrypted data block, the first image file contains image data obtained after editing the original image, the encrypted data block is a data block obtained after encrypting the original image.

In an exemplary embodiment, the file analyzing module analyzes an image file, when determining that the image file carries indication information which is used for indicating partial encryption processing, determines a position of an encrypted data block contained in the image file according to the indication information, including:

the file analyzing module analyzes a first image file out from a forepart of the image file, after determining that file header information of the first image file carries first indication information which is used for indicating partial encryption processing, determines that the encrypted data block is behind a file terminator of the first image file, determines an end position of the encrypted data block according to length information of the encrypted data block contained in the first indication information.

In an exemplary embodiment, the file analyzing module analyzes an image file, when determining that the image file carrying indication information which is used for indicating partial encryption processing, determines a position of an encrypted data block contained in the image file according to the indication information, including:

the file analyzing module attempts to extract second indication information which is used for indicating partial encryption processing from a tail of the image file, if the second indication information is extracted, determines that the encrypted data block is before the second indication information, determines an initial position of the encrypted data block according to length information of the encrypted data block contained in the second indication information.

In an exemplary embodiment, the file analyzing module analyzes an image file, when determining that the image file carries indication information which is used for indicating partial encryption processing, determines a position of an encrypted data block contained in the image file according to the indication information, including:

the file analyzing module analyzes a first image file out from the forepart of the image file, attempts to extract third indication information which is used for indicating partial encryption processing behind the file terminator of the first image file, if the third indication information is extracted, determines that the encrypted data block is behind the third indication information, determines the end position of the encrypted data block according to length information of the encrypted data block contained in the third indication information.

In an exemplary embodiment, the decryption processing module reads and decrypts the encrypted data block, after decrypting successfully, obtains data of an original image, displays the original image, including:

the decryption processing module reads the encrypted data block, prompts a user to input a decryption password, after receiving the decryption password input by the user, decrypts the encrypted data block according to the decryption password, if decrypting successfully, obtains original image data before the encryption, displays the original image.

An embodiment of the present disclosure further provides a terminal, including a first memory and a first processor.

The first memory is configured to store instructions.

The first processor is coupled with the first memory, and is configured to execute instructions stored in the first memory. Herein, the first processor is configured to edit an original image, save the edited image as a first image file; encrypt the original image, generate an encrypted data block; splice the first image file with the encrypted data block to generate and save a partially-encrypted image file.

In an exemplary embodiment, the first processor splices the first image file with the encrypted data block to generate and save a partially-encrypted image file, including:

the first processor generates and saves the partially-encrypted image file containing the first image file and the encrypted data block, and in the partially-encrypted image file, file header information of the first image file carries first indication information, and the encrypted data block is spliced behind a file terminator of the first image file.

Herein, the first indication information is used to indicate partial encryption processing and contains length information of the encrypted data block and an indicator for indicating partial encryption processing.

In an exemplary embodiment, the first processor splices the first image file with the encrypted data block to generate and save a partially-encrypted image file, including:

the first processor generates and saves the partially-encrypted image file containing the first image file, the encrypted data block, and second indication information, in the partially-encrypted image file, after the encrypted data block is spliced behind the file terminator of the first image file, the second indication information is added behind the encrypted data block.

Herein, the second indication information is used to indicate partial encryption processing and contains length information of the encrypted data block and an indicator for indicating partial encryption processing.

In an exemplary embodiment, the first processor splices the first image file with the encrypted data block to generate and save a partially-encrypted image file, including:

the first processor generates and saves the partially-encrypted image file containing the first image file, the encrypted data block, and third indication information, in the partially-encrypted image file, the encrypted data block is spliced behind the file terminator of the first image file, the third indication information is added between the file terminator of the first image file and the encrypted data block.

Herein, the third indication information is used to indicate partial encryption processing and contains length information of the encrypted data block and an indicator for indicating partial encryption processing.

In an exemplary embodiment, the first processor encrypts the original image, including:

when a user has set an encryption password, the first processor encrypts the original image with the encryption password, when the user has not set an encryption password, prompts the user to set the encryption password, and after the encryption password set by the user is obtained, encrypts the original image with the encryption password.

The embodiment of the present disclosure further provides a terminal, including a second memory and a second processor.

The second memory is configured to store instructions.

The second processor is coupled with the second memory, and is configured to execute instructions stored in the second memory, herein, the second processor is configured to analyze an image file, when determining that the image file carries indication information which is used for indicating partial encryption processing, determine a position of an encrypted data block contained in the image file according to the indication information, read and decrypt the encrypted data block, after decrypting successfully, obtain data of an original image, display the original image.

Herein, the image file carrying the indication information is formed by splicing a first image file with the encrypted data block, the first image file contains image data obtained after editing the original image, the encrypted data block is a data block obtained after encrypting the original image.

In an exemplary embodiment, the second processor analyzes an image file, when determining that the image file carries indication information which is used for indicating partial encryption processing, determines a position of an encrypted data block contained in the image file according to the indication information, including:

the second processor analyzes a first image file out from a forepart of the image file, after determining that file header information of the first image file carries first indication information which is used for indicating partial encryption processing, determines that the encrypted data block is behind a file terminator of the first image file, determines an end position of the encrypted data block according to length information of the encrypted data block contained in the first indication information.

In an exemplary embodiment, the second processor analyzes an image file, when determining that the image file carries indication information which is used for indicating partial encryption processing, determines a position of an encrypted data block contained in the image file according to the indication information, including:

the second processor attempts to extract second indication information which is used for indicating partial encryption processing from a tail of the image file, if the second indication information is extracted, determines that the encrypted data block is before the second indication information, determines an initial position of the encrypted data block according to length information of the encrypted data block contained in the second indication information.

In an exemplary embodiment, the second processor analyzes an image file, when determining that the image file carries indication information which is used for indicating partial encryption processing, determines a position of an encrypted data block contained in the image file according to the indication information, including:

the second processor analyzes a first image file out from the forepart of the image file, attempts to extract third indication information which is used for indicating partial encryption processing from behind the file terminator of the first image file, if the third indication information is extracted, determines that the encrypted data block is behind the third indication information, determines the end position of the encrypted data block according to length information of the encrypted data block contained in the third indication information.

In an exemplary embodiment, the second processor reads and decrypts the encrypted data block, after decrypting successfully, obtains data of an original image, displays the original image, including:

the second processor reads the encrypted data block, prompts a user to input a decryption password, after receiving the decryption password input by the user, decrypts the encrypted data block according to the decryption password, if decrypting successfully, obtains original image data before the encryption, displays the original image.

Compared with the existing technology, embodiments of the present disclosure provide an image encryption method, an image viewing method, systems and terminals. A terminal can partially encrypt an image by the image encryption method of the embodiment of the present disclosure, and when viewing the encrypted image with the image viewing method of the embodiment of the present disclosure, if decrypting successfully, complete content of the image is displayed, if decrypting unsuccessfully, then only partial content of the image is displayed, thus meeting the protection requirements on the content of the image of the user.

After reading and understanding the drawings and detailed description, other aspects can be understood.

DETAILED DESCRIPTION

Hereinafter in conjunction with the accompanying drawings, the embodiments of the present disclosure will be described in detail. It should be illustrated that, under the situation of no conflict, the embodiments in the present application and the features in the embodiments can be freely combined.

When a user wants to encrypt an image, a terminal can edit the image to be encrypted by the image encryption method of the embodiment of the present disclosure. The terminal can further process (e.g., paint) the portion to be protected, and then encrypts the original image, saves the edited image and the encrypted original image as a new partially-encrypted image file.

When the user wants to view the above-mentioned partially-encrypted image, the user can see the real image before editing after a decryption of the partially-encrypted image is successful by using the image viewing method of the embodiment of the present disclosure. If the decryption is unsuccessful, the user can only see the edited image (that is, partial content of the original image). In addition, if the user uses other image viewing applications to open the above-mentioned partially-encrypted image file, only the partial content of the image can be seen.

The storage format of the above-mentioned partially-encrypted image file maintains a normal file format, but it has some distinguishing features. The edited image (that is, partial content of the original image) can be displayed by using the normal image viewing application. The embodiment of the invention utilizes the fault-tolerant mechanism of the modern image processing software for the commonly used image format. Because the image can always have the transmission error in the transmission process, the modern image processing software tries the best to perform the fault-tolerant processing on the image, so as to ensure that the user can see the image. There is an important mechanism in these fault-tolerant mechanisms: if a file terminator specified by the file format is read, the process ends, bytes are no longer read. In a file structure of the partially-encrypted image of the embodiment of the present disclosure, the data of the edited image is placed in the forepart and the encrypted original image data block is placed behind the file terminator of the edited image data (actually, messy code). The formats of the image file are various, taking the commonly used JPG format as an example, (JPG format here refers to the file storage format of the JPG image, such as JPEG File Interchange Format (JFIF) or Exchangeable Image File (EXIF) storage format), JPG file format always starts with FFD8, ending with FFD9. Ordinary image viewing software generally read until FFD9 is reached, the added bytes behind the FFD9 will not affect the display of the image.

Figure 1:
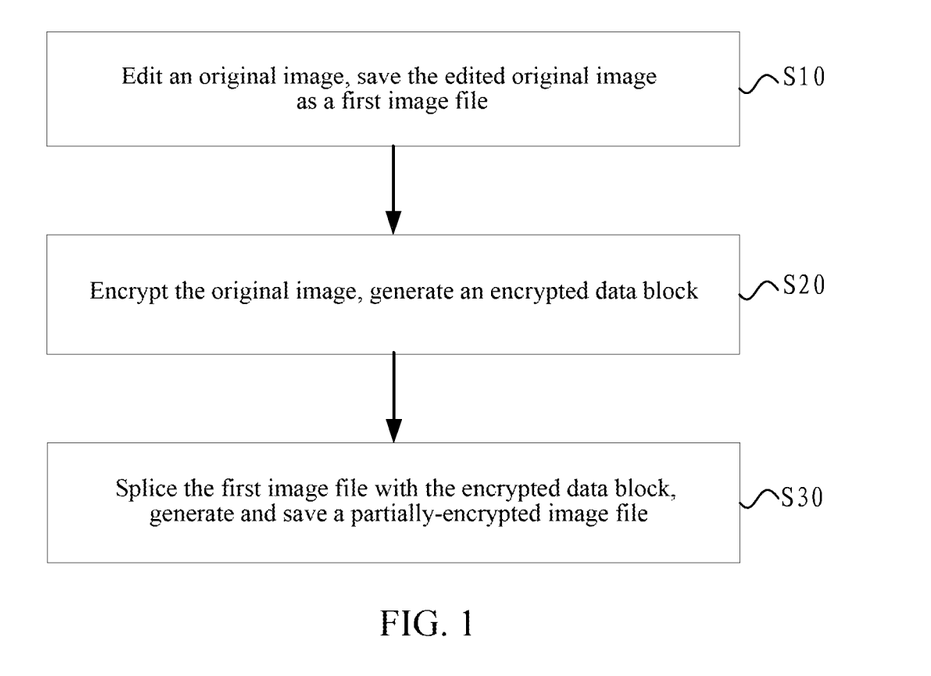
FIG. 1 is a flow chart of an image encryption method in accordance with an embodiment of the present disclosure.

As shown in FIG. 1, an embodiment of the present disclosure provides an image encryption method, including the following steps S10-S30.

In step S10, an original image is edited, and the edited original image is saved as a first image file.

In step S20, the original image is encrypted, and an encrypted data block is generated.

In step S30, the first image file is spliced with the encrypted data block, and a partially-encrypted image file is generated and saved.

The image encryption method can further include the following features.

The storage format of the first image file can be a format of EXIF (Exchangeable Image File) or JFIF (JPEG File Interchange Format). The original image can be any image format. Editing the original image includes: editing and processing, such as painting, covering, the content needed to be protected in the image.

In the embodiment, the Step 30 includes: generating and saving the partially-encrypted image file containing the first image file and the encrypted data block. Herein, in the partially-encrypted image file, file header information of the first image file carries first indication information, and the encrypted data block is spliced behind a file terminator of the first image file.

The first indication information is used to indicate partial encryption processing and contains length information of the encrypted data block and an indicator for indicating partial encryption processing.

The storage format of the first image file can be an EXIF format.

In the embodiment, the Step 30 includes: generating and saving the partially-encrypted image file containing the first image file, the encrypted data block, and second indication information. Herein, in the partially-encrypted image file, the encrypted data block is spliced behind the file terminator of the first image file, the second indication information is added behind the encrypted data block.

The second indication information is used to indicate partial encryption process and contains length information of the encrypted data block and an indicator for indicating partial encryption processing.

The second indication information is a character string with a fixed length, and the indicator for indicating the encryption process is located at a fixed position of the character string.

In the embodiment, the Step 30 includes: generating and saving the partially-encrypted image file containing the first image file, the encrypted data block, and third indication information. Herein in the partially-encrypted image file, the encrypted data block is spliced behind the file terminator of the first image file, the third indication information is added between the file terminator of the first image file and the encrypted data block.

The third indication information is used to indicate a partial encryption processing and contains length information of the encrypted data block and an indicator for indicating partial encryption processing.

The third indication information is a character string with a fixed length, and the indicator for indicating the encryption process is located at a fixed position of the character string.

Encrypting the original image includes the following operation. When a user has set an encryption password, the original image is encrypted with the encryption password. When the user has not set an encryption password, the user is prompted to set the encryption password, and after the encryption password set by the user is obtained, the original image is encrypted with the set encryption password.

When encrypting data by using encryption password, the data encryption method in the existing technology can be used. In general, the encryption key is generated according to the encryption password, and then the data is encrypted by using the encryption key through the encryption algorithm. When decrypting the encrypted data, the decryption key is generated according to the decryption password, the encrypted data block is decrypted by using the decryption key through the decryption algorithm. The decryption process corresponds to the encryption process.

Herein, the method further includes: after the user has updated the encryption password, the saved encryption password is updated.

Figure 2:
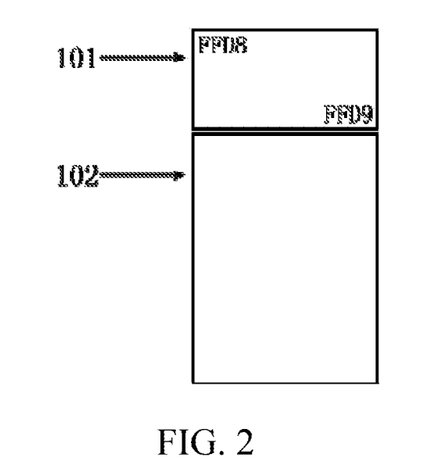
FIG. 2 is a structural schematic diagram of a partially-encrypted image file (taking a JPG format as an example) in accordance with an embodiment of the present disclosure.

As shown in FIG. 2, in the structure of the partially-encrypted image file of the embodiment of the present disclosure, the original image is edited to generate the first image file (101 in FIG. 2), and the original image is encrypted to generate the encrypted data block (102 in FIG. 2), the encrypted data block is spliced behind the file terminator FFD9 of the first image file. The original image before the encryption can be in arbitrary image format, even RAW (unprocessed) format file.

When the normal image viewing software is viewing the image file that has been partially encrypted in the present scheme, the process will end only when the file terminator FFD9 of the first image file (including the partial contents of the original image) is read, and only the partial content of the original image is displayed, while the encrypted original image data behind the file terminator FFD9 is ignored.

In order to make the image viewing application of the embodiment of the present disclosure to recognize that the image file is partially encrypted, it is necessary to add some distinguishable features into the partially-encrypted image file, and there are two alternative schemes.

1) Scheme One

The indication information can be added into the detailed instruction information of the image of the first image file (generally in the file header information), for example, a data segment is specially designed in the EXIF storage format for attaching the detailed instruction information of the image.

For example, the item "Author" of the detailed instruction information of the image in the first image file can be filled with "PartialEncryXXXXXXXX". The image viewing application of the embodiment of the present disclosure can distinguish that the image file is a partially-encrypted file according to "PartialEncry"; and XXXXXXXX is fixedly an 8-bit length hexadecimal digit string, indicating the length of the encrypted data block.

2) Scheme Two

A character string is added between the first image file and the encrypted data block, or behind the encrypted data block. The character string begins with a special indicator.

For example, a character string "PartialEncryXXXXXXXX" is added behind the encrypted data block. When the image viewing application of the embodiment of the present disclosure has read that the last 20 bytes of the partially-encrypted image file begin with "PartialEncry", it is judged that the file is a partially-encrypted image file. While XXXXXXXX is fixedly an 8-bit length hexadecimal digit string, indicating the length of the encrypted data block.

Figure 3:
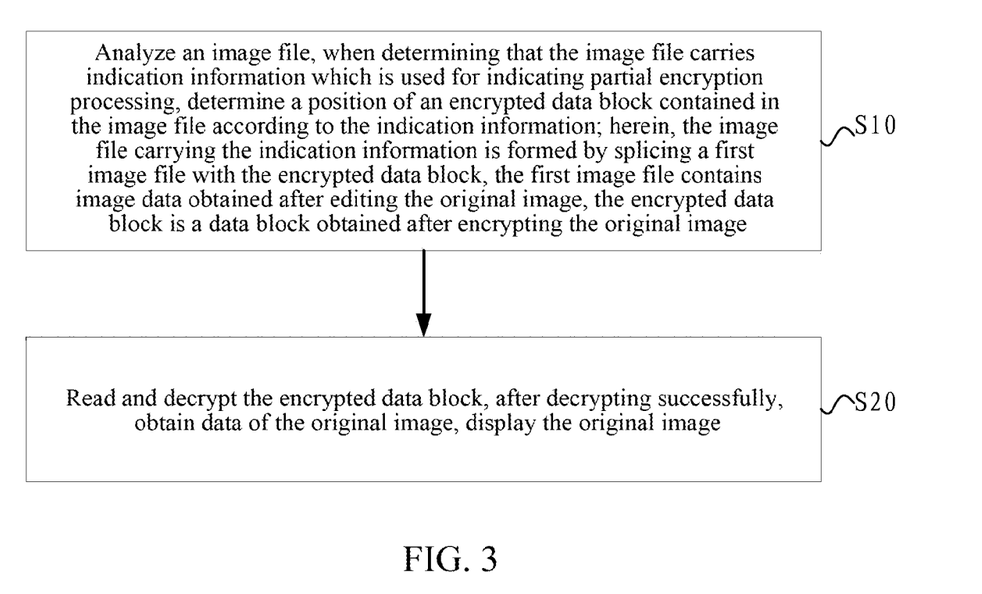
FIG. 3 is a flow chart of an image viewing method in accordance with an embodiment of the present disclosure.

As shown in FIG. 3, an embodiment of the present disclosure provides an image viewing method, including the following steps S10-S20.

In step S10, an image file is analyzed, when determining that the image file carries indication information which is used for indicating partial encryption processing, a position of an encrypted data block contained in the image file is determined according to the indication information.

In step S20, the encrypted data block is read and decrypted, after decrypting the encrypted data block successfully, the data of the original image is obtained, the original image is displayed.

The image file carrying the indication information is formed by splicing a first image file with the encrypted data block, the first image file contains image data obtained after the original image is edited, the encrypted data block is a data block obtained after encrypting the original image.

The image viewing method can further include the following features.

In the embodiment, an image file is analyzed, when determining that the image file carries indication information which is used for indicating partial encryption processing, a position of an encrypted data block contained in the image file is determined according to the indication information. The above operation includes:

A first image file is analyzed out from a forepart of the image file. After determining that file header information of the first image file carries first indication information which is used for indicating partial encryption processing, it is determined that the encrypted data block is behind a file terminator of the first image file, and an end position of the encrypted data block is determined according to length information of the encrypted data block contained in the first indication information.

The image obtained after editing the original image is: an image obtained after editing and processing, such as painting, covering, the content needed to be protected in the original image.

The storage format of the first image file can be an EXIF format.

In the embodiment, an image file is analyzed, when determining that the image file carries indication information which is used for indicating partial encryption processing, a position of an encrypted data block contained in the image file is determined according to the indication information. The above operation includes:

It is attempted to extract second indication information for indicating partial encryption processing from a tail of the image file. If the second indication information is extracted, it is determined that the encrypted data block is before the second indication information, an initial position of the encrypted data block is determined according to the length information of the encrypted data block contained in the second indication information.

The second indication information is a character string with a fixed length, and the indicator for indicating the encryption process is located at a fixed position of the character string.

In the embodiment, an image file is analyzed, when determining that the image file carries indication information which is used for indicating partial encryption processing, a position of an encrypted data block contained in the image file is determined according to the indication information. The above operation includes:

A first image file is analyzed out from a forepart of the image file, it is attempted to extract third indication information which is used for indicating the partial encryption processing from behind the file terminator of the first image file. If the third indication information is extracted, it is determined that the encrypted data block is behind the third indication information, the end position of the encrypted data block is determined according to the length information of the encrypted data block contained in the third indication information.

The third indication information is a character string with a fixed length, and the indicator for indicating the encryption process is located at a fixed position of the character string.

The encrypted data block is read and decrypted, after decrypting successfully, the data of the original image is obtained, the original image is displayed. The above operation includes:

The encrypted data block is read, a user is prompted to input a decryption password. After receiving the decryption password input by the user, the encrypted data block is decrypted according to the decryption password, if decrypting successfully, the original image data before the encryption is obtained, the original image is displayed.

Reading and decrypting the encrypted data block further includes the following operation. The encrypted data block is read, a user is prompted to input a decryption password. If receiving the decryption password input by the user, but failing to decrypt the encrypted data block with the decryption password, or failing to obtain the decryption password, when the first image file has been analyzed out, the contents of the edited original image contained in the first image file are displayed. When the first image file has not yet been analyzed out, the first image file is analyzed out from the forepart of the image file and then the contents of the edited original image contained in the first image file are displayed.

Figure 4:
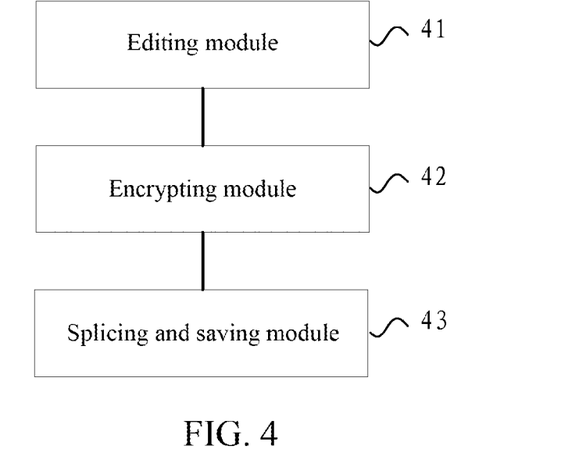
FIG. 4 is a structural schematic diagram of an image encryption system in accordance with an embodiment of the present disclosure.

As shown in FIG. 4, an embodiment of the present disclosure provides an image encryption system, including an editing module 41, an encrypting module 42 and a splicing and saving module 43.

The editing module 41 is configured to edit an original image, save the edited original image as a first image file.

The encrypting module 42 is configured to encrypt the original image, generate an encrypted data block.

The splicing and saving module 43 is configured to splice the first image file with the encrypted data block to generate and save a partially-encrypted image file.

The image encryption system can further include the following features.

In the embodiment, the splicing and saving module 43 splices the first image file with the encrypted data block to generate and save a partially-encrypted image file, including:

the splicing and saving module 43 generates and saves a partially-encrypted image file containing the first image file and the encrypted data block, and in the partially-encrypted image file, file header information of the first image file carries first indication information, and the encrypted data block is spliced behind a file terminator of the first image file.

Herein, the first indication information is used to indicate partial encryption processing and contains length information of the encrypted data block and an indicator for indicating partial encryption processing.

In the embodiment, the splicing and saving module 43 splices the first image file with the encrypted data block to generate and save a partially-encrypted image file, including:

the splicing and saving module 43 generates and saves the partially-encrypted image file containing the first image file, the encrypted data block, and second indication information. In the partially-encrypted image file, the encrypted data block is spliced behind the file terminator of the first image file, the second indication information is added behind the encrypted data block.

Herein, the second indication information is used to indicate partial encryption processing and contains length information of the encrypted data block and an indicator for indicating partial encryption processing.

In the embodiment, the splicing and saving module 43 splices the first image file with the encrypted data block to generate and save a partially-encrypted image file, including:

the splicing and saving module 43 generates and saves the partially-encrypted image file containing the first image file, the encrypted data block, and third indication information. In the partially-encrypted image file, the encrypted data block is spliced behind the file terminator of the first image file, the third indication information is added between the file terminator of the first image file and the encrypted data block.

Herein, the third indication information is used to indicate partial encryption processing and contains length information of the encrypted data block and an indicator for indicating partial encryption processing.

The encrypting module 42 encrypts the original image, including:

when a user has set an encryption password, the encrypting module 42 encrypts the original image with the encryption password, when the user has not set an encryption password, the encrypting module 42 prompts the user to set the encryption password, and after the encryption password set by the user is obtained, encrypts the original image with the encryption password.

Figure 5:
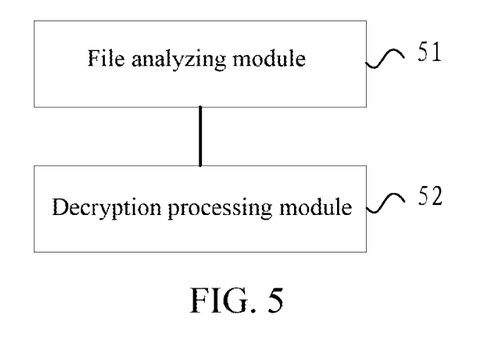
FIG. 5 is a structural schematic diagram of an image viewing system in accordance with an embodiment of the present disclosure.

As shown in FIG. 5, an embodiment of the present disclosure provides an image viewing system, including a file analyzing module 51 and a decryption processing module 52.

The file analyzing module 51 is configured to analyze an image file, when determining that the image file carries indication information which is used for indicating partial encryption processing, determine a position of an encrypted data block contained in the image file according to the indication information.

The decryption processing module 52 is configured to read and decrypt the encrypted data block, after decrypting the encrypted data block successfully, obtain the data of an original image, display the original image.

The image file carrying the indication information is formed by splicing a first image file with the encrypted data block, the first image file contains image data obtained after editing the original image, the encrypted data block is a data block obtained after encrypting the original image.

The image viewing system can further include the following features.

In the embodiment, the file analyzing module 51 analyzes an image file, when determining that the image file carries indication information which is used for indicating partial encryption processing, determines a position of an encrypted data block contained in the image file according to the indication information, including:

the file analyzing module 51 analyzes a first image file out from a forepart of the image file, after determining that file header information of the first image file carries first indication information which is used for indicating partial encryption processing, determines that the encrypted data block is behind a file terminator of the first image file, determines an end position of the encrypted data block according to length information of the encrypted data block contained in the first indication information.

Herein, the first indication information is used to indicate partial encryption processing and contains length information of the encrypted data block and an indicator for indicating partial encryption processing.

In the embodiment, the file analyzing module 51 analyzes an image file, when determining that the image file carries indication information which is used for indicating partial encryption processing, determines a position of an encrypted data block contained in the image file according to the indication information, including:

the file analyzing module 51 attempts to extract second indication information for indicating the partial encryption processing from a tail of the image file, if the second indication information is extracted, determines that the encrypted data block is before the second indication information, determines an initial position of the encrypted data block according to the length information of the encrypted data block contained in the second indication information.

Herein, the second indication information is used to indicate partial encryption processing and contains length information of the encrypted data block and an indicator for indicating partial encryption processing.

In the embodiment, the file analyzing module 51 analyzes an image file, when determining that the image file carries indication information which is used for indicating partial encryption processing, determines a position of an encrypted data block contained in the image file according to the indication information, including:

the file analyzing module 51 analyzes a first image file out from the forepart of the image file, attempts to extract third indication information which is used for indicating partial encryption processing from behind the file terminator of the first image file, if the third indication information is extracted, determines that the encrypted data block is behind the third indication information, determines the end position of the encrypted data block according to length information of the encrypted data block contained in the third indication information.

Herein, the third indication information is used to indicate partial encryption processing and contains length information of the encrypted data block and an indicator for indicating partial encryption processing.

The decryption processing module 52 reads and decrypts the encrypted data block, after decrypting the encrypted data block successfully, obtains the data of an original image, displays the original image, including:

the decryption processing module 52 reads the encrypted data block, prompts a user to input a password, after the password input by the user is received, decrypts the encrypted data block according to the password, if decrypting the encrypted data block successfully, obtains the original image data before the encryption, displays the original image.

Figure 6:
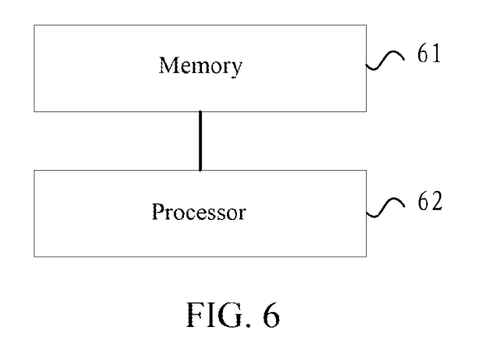
FIG. 6 is a structural schematic diagram of a terminal (which can encrypt an image) in accordance with an embodiment of the present disclosure.

As shown in FIG. 6, an embodiment of the present disclosure provides a terminal, including a memory 61 and a processor 62.

The memory 61 is configured to store instructions.

The processor 62 is coupled with the memory, and is configured to execute instructions stored in the memory. Herein, the processor is configured to edit an original image, save the edited image as a first image file; encrypt the original image, generate an encrypted data block; splice the first image file with the encrypted data block to generate and save a partially-encrypted image file.

The terminal can further include the following features.

In the embodiment, the processor 62 splices the first image file with the encrypted data block to generate and save a partially-encrypted image file, including:

the processor 62 generates and saves a partially-encrypted image file containing the first image file and the encrypted data block, and in the partially-encrypted image file, file header information of the first image file carries first indication information, and the encrypted data block is spliced behind a file terminator of the first image file.

Herein, the first indication information is used to indicate partial encryption processing and contains length information of the encrypted data block and an indicator for indicating partial encryption processing.

In the embodiment, the processor 62 splices the first image file with the encrypted data block to generate and save a partially-encrypted image file, including:

the processor 62 generates and saves the partially-encrypted image file containing the first image file, the encrypted data block, and second indication information, in the partially-encrypted image file, the encrypted data block is spliced behind the file terminator of the first image file, the second indication information is added behind the encrypted data block.

Herein, the second indication information is used to indicate partial encryption processing and contains length information of the encrypted data block and an indicator for indicating partial encryption processing.

In the embodiment, the processor 62 splices the first image file with the encrypted data block to generate and save a partially-encrypted image file, including:

the processor 62 generates and saves the partially-encrypted image file containing the first image file, the encrypted data block, and third indication information, in the partially-encrypted image file, the encrypted data block is spliced behind the file terminator of the first image file, the third indication information is added between the file terminator of the first image file and the encrypted data block.

Herein, the third indication information is used to indicate partial encryption processing and contains length information of the encrypted data block and an indicator for indicating partial encryption processing.

The processor 62 encrypts the original image, including:

when a user has set an encryption password, the processor 62 encrypts the original image with the encryption password, when the user has not set an encryption password, the processor 62 prompts the user to set the encryption password, and after the encryption password set by the user is obtained, encrypts the original image with the encryption password.

Figure 7:
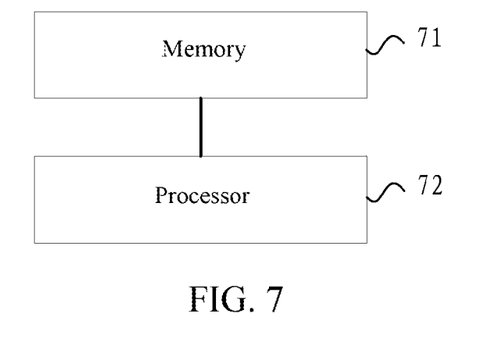
FIG. 7 is a structural schematic diagram of a terminal (which can view an encrypted image) in accordance with an embodiment of the present disclosure.

As shown in FIG. 7, an embodiment of the present disclosure provides a terminal, including a memory 71 and a processor 72.

The memory 71 is configured to store instructions.

The processor 72 is coupled with the memory, and is configured to execute instructions stored in the memory. Herein, the processor is configured to analyze an image file, when determining that the image file carries indication information which is used for indicating partial encryption processing, determine a position of an encrypted data block contained in the image file according to the indication information, read and decrypt the encrypted data block, after decrypting the encrypted data block successfully, obtain data of an original image, display the original image.

Herein, the image file carrying the indication information is formed by splicing a first image file with the encrypted data block, the first image file contains image data obtained after editing the original image, the encrypted data block is a data block obtained after encrypting the original image.

The terminal can further include the following features.

In the embodiment, the processor 72 analyzes an image file, when determining that the image file carries indication information which is used for indicating partial encryption processing, determines a position of an encrypted data block contained in the image file according to the indication information, including:

the processor 72 analyzes a first image file out from a forepart of the image file, after determining that file header information of the first image file carries first indication information which is used for indicating partial encryption processing, determines that the encrypted data block is behind a file terminator of the first image file, determines an end position of the encrypted data block according to length information of the encrypted data block contained in the first indication information.

In the embodiment, the processor 72 analyzes an image file, when determining that the image file carries indication information which is used for indicating partial encryption processing, determines a position of an encrypted data block contained in the image file according to the indication information, including:

the processor 72 attempts to extract second indication information for indicating the partial encryption processing from a tail of the image file, if the second indication information is extracted, determines that the encrypted data block is before the second indication information, determines an initial position of the encrypted data block according to length information of the encrypted data block contained in the second indication information.

In the embodiment, the processor 72 analyzes an image file, when determining that the image file carries indication information which is used for indicating partial encryption processing, determines a position of an encrypted data block contained in the image file according to the indication information, including:

the processor 72 analyzes a first image file out from the forepart of the image file, attempts to extract third indication information which is used for indicating the partial encryption processing from behind the file terminator of the first image file, if the third indication information is extracted, determines that the encrypted data block is behind the third indication information, determines the end position of the encrypted data block according to length information of the encrypted data block contained in the third indication information.

Herein, the processor 72 reads and decrypts the encrypted data block, after decrypting the encrypted data block successfully, obtains data of an original image, displays the original image, including:

the processor 72 reads the encrypted data block, prompts a user to input a decryption password, after receiving the decryption password input by the user, decrypts the encrypted data block according to the decryption password, if decrypting the encrypted data block successfully, obtains the original image data before the encryption, displays the original image.

The above-mentioned embodiments provide an image encryption method, an image viewing method, systems and terminals. A terminal can partially encrypt the image by the image encryption method of the embodiment of the present disclosure. And when viewing the encrypted image with the image viewing method of the embodiment of the present disclosure, if decrypting successfully, complete content of the image is displayed, if decrypting unsuccessfully, only partial content of the image is displayed, thus meeting the protection requirements on the content of the image of the user.

Those ordinarily skilled in the art can understand that all or some of steps of the above-mentioned method may be completed by the programs instructing the relevant hardware, and the programs may be stored in a computer-readable storage medium, such as read only memory, magnetic or optical disk. Alternatively, all or some of the steps of the above-mentioned embodiments can also be implemented by using one or more integrated circuits, accordingly, each module/unit in the above-mentioned embodiments can be realized in a form of hardware, or in a form of software function module. The present disclosure is not limited to any specific form of hardware and software combinations.

INDUSTRIAL APPLICABILITY

The embodiments of the present disclosure provide an image encryption method, an image viewing method, system and terminal. A terminal can partially encrypt the image by the image encryption method of the embodiment of the present disclosure. And when viewing the encrypted image with the image viewing method of the embodiment of the present disclosure, if decrypting successfully, complete content of the image is displayed, if decrypting unsuccessfully, then only partial content of the image is displayed, thus meeting the protection requirements on the content of the image of the user.

What is claimed is:

1. An image viewing method, comprising:
analyzing an image file, when determining that the image file carries indication information which is used for indicating partial encryption processing, determining a position of an encrypted data block contained in the image file according to the indication information; and
reading and decrypting the encrypted data block, after decrypting successfully, obtaining data of an original image, and displaying the original image;
wherein, the image file carrying the indication information is formed by splicing a first image file with the encrypted data block, the first image file contains image data obtained after editing the original image, the encrypted data block is a data block obtained after encrypting the original image, the encrypted data block is spliced behind a file terminator of the first image file, and the indication information contains length information of the encrypted data block and an indicator for indicating partial encryption processing.

2. The method of claim 1, wherein,
analyzing the image file, when determining that the image file carries the indication information which is used for indicating partial encryption processing, determining the position of the encrypted data block contained in the image file according to the indication information comprises:
analyzing a first image file out from a forepart of the image file, after determining that file header information of the first image file carries first indication information which is used for indicating partial encryption processing, determining that the encrypted data block is behind a file terminator of the first image file, and determining an end position of the encrypted data block according to length information of the encrypted data block contained in the first indication information.

3. The method of claim 1, wherein,
analyzing the image file, when determining that the image file carries the indication information which is used for indicating partial encryption processing, determining the position of the encrypted data block contained in the image file according to the indication information comprises:
attempting to extract second indication information which is used for indicating partial encryption processing from a tail of the image file, when the second indication information is extracted, determining that the encrypted data block is before the second indication information, and determining an initial position of the encrypted data block according to length information of the encrypted data block contained in the second indication information.

4. The method of claim 1, wherein,
analyzing the image file, when determining that the image file carries the indication information which is used for indicating partial encryption processing, determining the position of the encrypted data block contained in the image file according to the indication information comprises:
analyzing a first image file out from the forepart of the image file, attempting to extract third indication information which is used for indicating partial encryption processing from behind the file terminator of the first image file, when the third indication information is extracted, determining that the encrypted data block is behind the third indication information, and determining the end position of the encrypted data block according to length information of the encrypted data block contained in the third indication information.

5. The method of claim 2, wherein,
reading and decrypting the encrypted data block, after decrypting successfully, obtaining data of the original image, and displaying the original image comprises:
reading the encrypted data block, prompting a user to input a decryption password, after receiving the decryption password input by the user, decrypting the encrypted data block according to the decryption password, when decrypting successfully, obtaining original image data before the encryption, and displaying the original image.

6. A terminal, comprising:
a second memory, configured to store instructions; and
a second processor, couple with the second memory, configured to execute instructions stored in the second memory, wherein, the second processor is configured to analyze an image file, when determining that the image file carries indication information which is used for indicating partial encryption processing, determine a position of an encrypted data block contained in the image file according to the indication information, read and decrypt the encrypted data block, after decrypting successfully, obtain data of an original image, and display the original image;
wherein, the image file carrying the indication information is formed by splicing a first image file with the encrypted data block, the first image file contains image data obtained after editing the original image, the encrypted data block is a data block obtained after encrypting the original image, the encrypted data block is spliced behind a file terminator of the first image file, and the indication information contains length information of the encrypted data block and an indicator for indicating partial encryption processing.

7. The terminal of claim 6, wherein,
the second processor analyzes the image file, when determining that the image file carries the indication information which is used for indicating partial encryption processing, determines the position of the encrypted data block contained in the image file according to the indication information, comprising that:
the second processor analyzes a first image file out from a forepart of the image file, after determining that file header information of the first image file carries first indication information which is used for indicating partial encryption processing, determines that the encrypted data block is behind a file terminator of the first image file, and determines an end position of the encrypted data block according to length information of the encrypted data block contained in the first indication information,
or,
the second processor analyzes an image file, when determining that the image file carries indication information which is used for indicating partial encryption processing, determines the position of an encrypted data block contained in the image file according to the indication information, comprising that:

the second processor attempts to extract second indication information which is used for indicating partial encryption processing from a tail of the image file, when the second indication information is extracted, determines that the encrypted data block is before the second indication information, and determines an initial position of the encrypted data block according to length information of the encrypted data block contained in the second indication information, or, the second processor analyzes an image file, when determining that the image file carries indication information which is used for indicating partial encryption processing, determines the position of an encrypted data block contained in the image file according to the indication information, comprising that:

the second processor analyzes a first image file out from the forepart of the image file, attempts to extract third indication information which is used for indicating partial encryption processing from behind the file terminator of the first image file, when the third indication information is extracted, determines that the encrypted data block is behind the third indication information, and determines the end position of the encrypted data block according to length information of the encrypted data block contained in the third indication information.

8. The terminal of claim 6, wherein:

the second processor reads and decrypts the encrypted data block, after decrypting successfully, obtains data of the original image, and displays the original image, comprising that:

the second processor reads the encrypted data block, prompts a user to input a decryption password, after receiving the decryption password input by the user, decrypts the encrypted data block according to the decryption password, when decrypting successfully, obtains original image data before the encryption, and displays the original image.

* * * * *